US005608854A

United States Patent [19]
Labedz et al.

[11] Patent Number: 5,608,854
[45] Date of Patent: Mar. 4, 1997

[54] METHOD AND APPARATUS FOR DISPLAYING INFORMATION IN A COMMUNICATION SYSTEM

[75] Inventors: Gerald P. Labedz, Chicago; Mark T. Ahlenius, Lombard; Robert T. Love, Barrington, all of Ill.

[73] Assignee: Motorola, Inc., Schaumburg, Ill.

[21] Appl. No.: 429,253

[22] Filed: Apr. 25, 1995

[51] Int. Cl.⁶ .................................................. G06F 15/00
[52] U.S. Cl. ............................................................ 395/141
[58] Field of Search ........................................ 395/140, 141, 395/142, 156, 161; 345/16, 18

[56] References Cited

U.S. PATENT DOCUMENTS

| | | | |
|---|---|---|---|
| 4,845,745 | 7/1989 | Havel | 379/354 |
| 4,926,497 | 5/1990 | Shirley, Jr. et al. | 455/67 |
| 4,942,540 | 7/1990 | Black et al. | 364/514 |
| 4,964,065 | 10/1990 | Hicks et al. | 364/514 |
| 5,023,900 | 6/1991 | Tayloe et al. | 379/32 |
| 5,055,851 | 10/1991 | Sheffer | 342/457 |
| 5,109,399 | 4/1992 | Thompson | 379/45 |
| 5,134,709 | 7/1992 | Bi et al. | 455/33.1 |
| 5,179,722 | 1/1993 | Gunmar et al. | 455/33.1 |
| 5,230,078 | 7/1993 | Varely et al. | 455/67.1 |
| 5,241,302 | 8/1993 | Thong | 340/701 |
| 5,247,699 | 9/1993 | Hartman | 455/33.1 |
| 5,276,789 | 1/1994 | Besaw et al. | 395/140 |
| 5,293,640 | 3/1994 | Gunmar et al. | 455/33.1 |
| 5,295,244 | 3/1994 | Dev et al. | 395/161 |
| 5,307,510 | 4/1994 | Gunmar et al. | 455/67.1 |
| 5,440,675 | 8/1995 | Matsunaga et al. | 395/140 |
| 5,450,535 | 9/1995 | North | 395/140 |
| 5,481,668 | 1/1996 | Marcus | 395/161 |
| 5,485,175 | 1/1996 | Suzuki | 395/156 |

FOREIGN PATENT DOCUMENTS 3545354  7/1986  Germany.

*Primary Examiner*—Phu K. Nguyen
*Attorney, Agent, or Firm*—Anthony G. Sitko; Jeffrey G. Toler

[57] ABSTRACT

A method and apparatus for understanding information relating to communication system performance, including the dynamic nature of the system is provided. Elements of the system are represented (102, 110) as various shapes (30, 32, 40) defined by an number of different parameters on a display device (24). The shapes are characterized by a number of defining parameters and these defining parameters have an association with performance characteristics or performance parameters of the system element. As performance parameter data changes with time, e.g., during system operation, the defining parameters are altered such that the shape representing the system element is modified (106, 114). In this manner a large number of system elements and associated performance characteristics and the time varying nature thereof can be readily displayed to aid the system operator.

20 Claims, 3 Drawing Sheets

METHOD AND APPARATUS FOR DISPLAYING INFORMATION IN A COMMUNICATION SYSTEM

RELATED APPLICATIONS

The present application is related to commonly assigned U.S. patent applications Ser. No. 08/024,0148, filed Mar. 1, 1993 and entitled "Graphical Interface for Cellular System" and Ser. No. 8/063,830, filed May 5, 1993 and entitled "Method of Topographically Displaying Selected Information in a Cellular Communication System".

FIELD OF THE INVENTION

The field of the invention relates to cellular communication systems and, in particular, to methods of and systems for displaying information within a communication system.

BACKGROUND OF THE INVENTION

Communication systems and cellular communication systems, in general, are well known. Planning and operating a cellular communication system requires the evaluation of very large amounts of data relating to such matters as transmitter output power, handover status of mobile communication units, geographical areas of high or low signal quality, and the like. Moreover, this data is often inter-related making review and comprehension in tabular form a near impossibility. However, to properly plan and/or operate the cellular communication system it is essential that this data, as well as the inter-relationships, be thoroughly understood.

The need to evaluate large amounts of highly inter-related data is never more true than in planning and operating code division multiple access (CDMA) cellular communication systems. The unique features of CDMA, for example, multiple mobile communication units sharing a single communication resource (i.e., a radio channel) and soft handover (i.e., the mobile communication unit being in simultaneous communication with a plurality of base stations), as compared to other cellular communications technologies necessarily leads to complex and highly inter-related system performance data. One will readily appreciate that an effect within a CDMA system, for example, a base station power output increase, may have any number of causes, and is likely to have a number of contributing factors and effects.

In traditional communication system planning and operation, the system engineer would evaluate, typically in tabular or printed graph form, data relating to predicted or actual system performance. However, the highly complex nature of the data generated by modern, substantially more complex, communications systems greatly reduces the effectiveness of such activity. Therefore a need exists for methods and apparatus for displaying information in a communication system which allow for the visualization and ready comprehension of the communication system performance by a system operator.

DETAILED DESCRIPTION OF A PREFERRED EMBODIMENT

In order to understand the dynamic performance of modern communication systems, and particularly cellular communication systems, the performance characteristics of the system must be made readily discernible to the system operator. Taking as an exemplary system a CDMA cellular communication system, these performance characteristics or performance parameters, include, among others, base station transmitter power, system soft handover regions, communication unit soft handover status, base station rise, base station peak, etc. To understand each of these pieces of system data in the traditional manner requires many engineer hours pouring over incomprehensible amounts of tabular data. The present invention provides a method and apparatus which vastly simplifies the understanding of system performance data, including the dynamic nature of the data. In the present invention, elements of the system are represented as various shapes defined by an number of different parameters on a display device, e.g., a cathode ray tube (CRT), flat panel, etc. The shapes are characterized by a number of defining parameters and these defining parameters have an association with performance characteristics or performance parameters of the system element. As performance parameter data changes with time, e.g., during system operation, the defining parameters are altered such that the shape representing the system element is modified. In this manner a large number of system elements and associated performance characteristics can be readily displayed to and understood by a system operator.

A preferred embodiment of the present invention is discussed in relation to the operation and maintenance center (OMC) of a cellular communication system. It should be understood, however, that the present invention may be otherwise embodied, such as in a stand alone system planning tool, without departing from the fair scope of the present invention.

Figure 1:
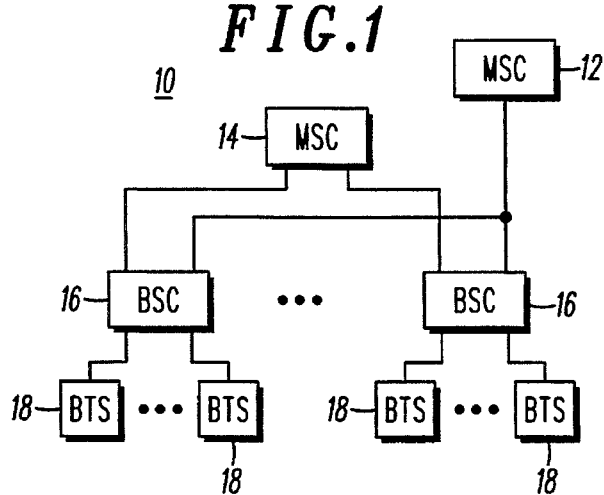
FIG. 1 is a block diagram representation of a cellular communication system incorporating the present invention.

Shown in FIG. 1, is a cellular communication system 10 having an OMC 12 incorporating the present invention. Cellular communication network 10 also includes a plurality of system elements such as mobile switching centers, only one of which is shown, (MSC) 14 servicing a plurality of base station controllers (BSCs) 16 servicing a plurality of base transceiver stations (BTSs) 18 for providing access to cellular communication network 10 by mobile communication units in a well known manner.

OMC 12 is coupled to communicate with the BSCs 16 for providing a centralized point for the operation, administration and maintenance of the cellular network. It should be noted that additional OMCs, not shown, may be associated with the MSCs or other system elements. These OMCs would also, preferably, incorporate the present invention. The OMC 12 is operable to provide such functions as event and alarm management, fault management, performance management, configuration management, security management and includes a suitable graphic user interface (GUI) for providing interaction with the system operator.

Figure 2:
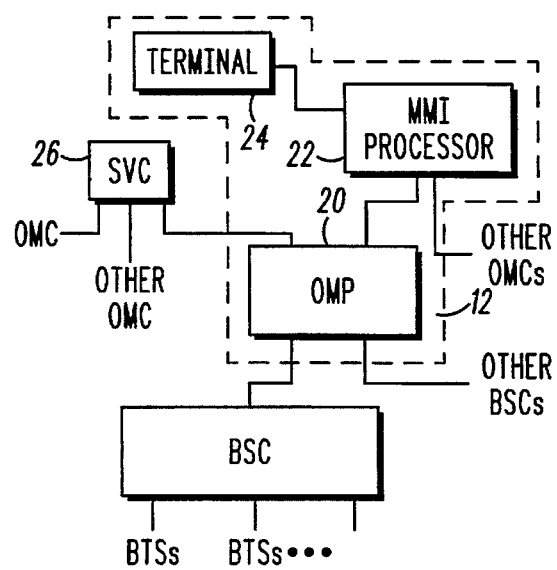
FIG. 2 is a block diagram representation of the operations and maintenance center of the cellular communication system illustrated in FIG. 1.

Shown in FIG. 2, is a block diagram representation of the OMC 12 shown in FIG. 1. OMC 12 includes an operations and maintenance processor (OMP) 20, a man-machine interface (MMI) processor 22, and a plurality of interface terminals 24, one of which is shown, and each including a graphic display device. OMC 12 may additionally be coupled to a supervisory center (SVC) 26, also preferably incorporating the present invention, for overall communication system evaluation and control.

The OMP 20 includes a database management system incorporating a management information database (MIB)in which the system configuration data, as well as performance data relating to the managed system elements of the cellular communication system 10 is maintained. During operation, system performance data is received and processed by the OMP and data relating to system performance is retained within the MIB. System data retained in the MIB is further available to MMI processor 22 for use in providing, in accordance with the present invention, a graphical representation to the system operator via the interface terminals 24 of information relating to the performance of cellular communication system 10.

Figure 3:
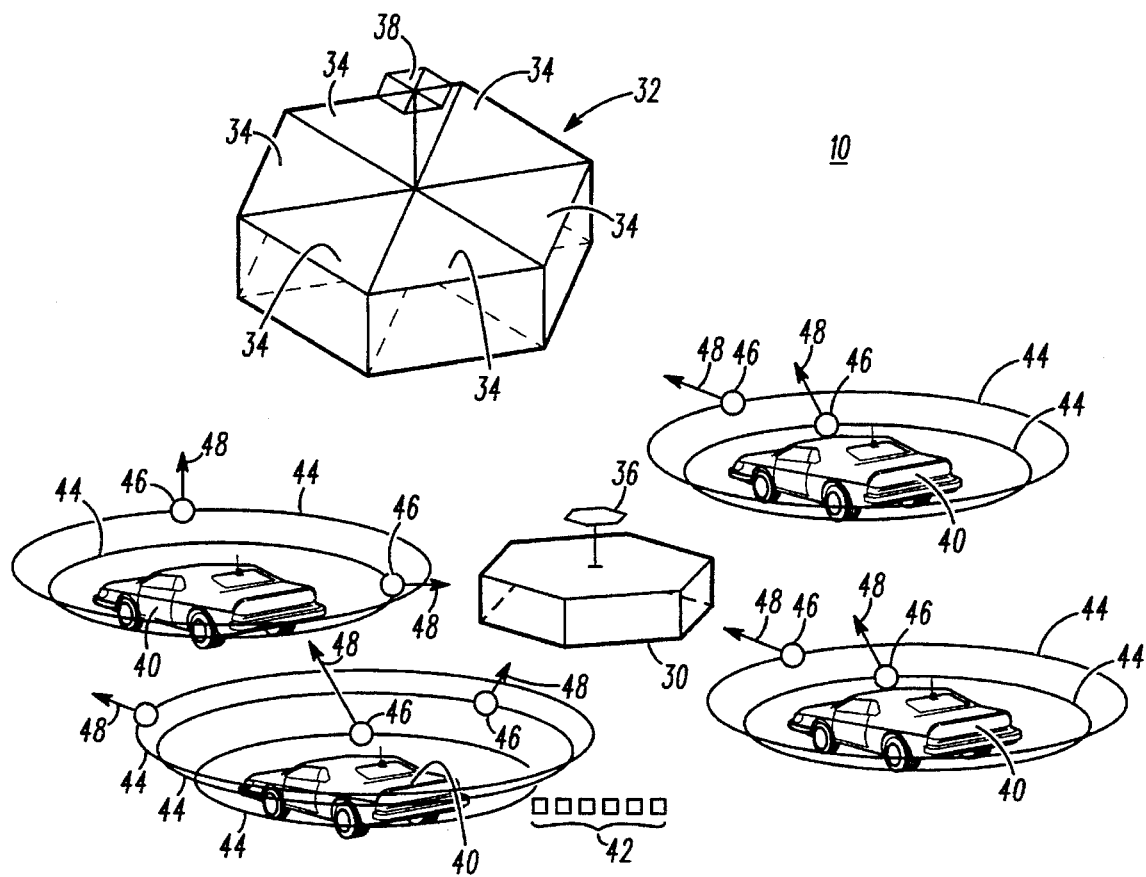
FIG. 3 is a graphical representation of information of a cellular communication system in accordance with a preferred embodiment of the present invention.

Shown in FIG. 3 is an exemplary graphical illustration of cellular communication system 10 in accordance with the present invention. A plurality of BTSs are illustrated as a plurality of shapes, generally polygon shapes, 30 and 32. Each polygon shape 30 and 32 is defined by a number of parameters which set, for example, the diameter and height, of the polygon shape. In the preferred embodiment each polygon shape 30 and 32 may further include a parameter defining a color or gray shade. In FIG. 3, polygon column 30 represents an omni-directional BTS and is shown as a hexagon. Polygon column 32 represents a sectored communication cell and is shown defined as a plurality of triangular shaped sections 34, with each triangular shaped section representing a sector of the sectored communication cell. Projecting from an upper surface of both polygon columns 30 and 32, are indicators 36 and 38, respectively. Indicator 36 is shown having substantially the same plan view shape as polygon column 30. Similarly, indicator 38 is shown having substantially the same plan view shape, i.e., a plurality of triangular shaped sections, as polygon column 32.

Figure 6:
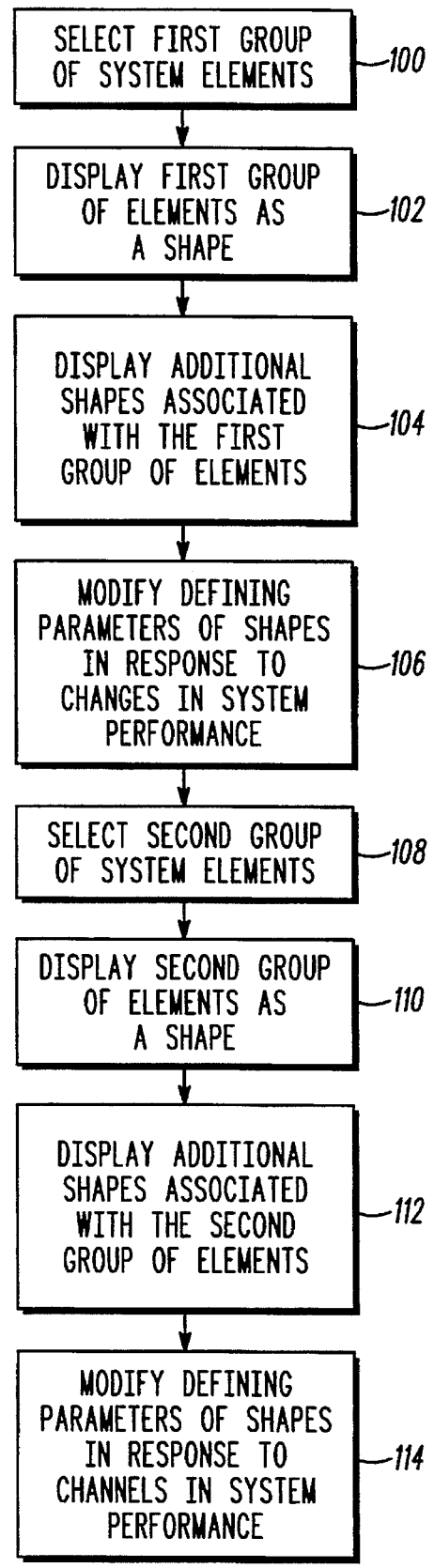
FIG. 6 is a flow chart illustrating a method of displaying information of a communication system in accordance with a preferred embodiment of the present invention.

In operation, and with reference to FIG. 6, MMI processor 22 acquires information relating to cellular communication system 10 from the MIB and selects a first group of system elements (step 100). For example, if the MIB contains information that cellular communication system 10 includes a first omni-directional BTS and a second sectored BTS, MMI processor 22 generates polygon shapes 30 and 32, respectively, (step 102) representing the first omni-directional BTS and the second sectored BTS on the graphical display of terminal 24. The MIB also contains information relating to the performance of each of the BTSs, such as reverse rise, peak rise, and transmitter output power. With these parameters, in the preferred embodiment, polygon columns 30 and 32 are defined with a height corresponding to the reverse rise, a color representing the transmitter power output as a percent of maximum, and with indicators 36 and 38 positioned above each of the columns at a height corresponding to the peak reverse rise of the BTS. As will be appreciated, the above referenced defining parameters of polygon columns 30 and 32 may represent other performance characteristics of the represented BTSs. Moreover, additional defining parameters, such as diameter of columns 30 and 32, or a convex or concave shape of indicators 36 and 38, may be used to provide a representation of still additional performance characteristics (step 104) such as a transitions from higher levels of soft handover to lower levels of soft handover in a CDMA system.

As system operation continues, the system performance parameters change, such as transmitter output power changes, and hence the characterizing parameters of polygon shapes 30 and 32 change. Therefore, as the system operates, polygon shapes are redefined within MMI processor 22 by modifying the defining parameters in response to changes in the performance characteristics of cellular communication system 10 (step 106) and thereby altering the representation of the information embodied as the shape generated on the display device. In this manner the system operator may visualize the present operation of the system. For example, as transmitter power output decreases, the color of polygon shapes 30 and 32 may change, or as reverse rise increases, the height of polygon shapes 30 and 32 may increase.

With continued reference to FIG. 3, automobile shapes 40 generally represent mobile communication units operating within cellular communication system 10. It should be understood that automobile shapes 40 may represent any type of communication unit suitable for use in cellular communication system 10 including portable and mobile communication units. Surrounding each automobile shape 40 are a plurality of colored rings 44, concentrically located about automobile shapes 40 and staggered in both height above automobile shapes 40 and in diameter. Positioned on rings 44, respectively, are spheres 46 including a directional indicator arrow 48.

In operation, and with further reference to FIG. 6, MMI processor 22 selects information from the MIB regarding the operation of mobile communication units within cellular communication system 10 (step 108). For each such mobile communication unit, it creates an automobile shape 40, and displays on the graphic display of terminal 24 (step 110) such shape in relative position to the BTSs represented by polygon columns 30 or 32, respectively, depending on whether or not the cell is omni-directional or sectored. The automobile shapes 40 are defined, for example, its size, color, position and orientation, based upon parameters associated with operating characteristics of the mobile communication unit. For example, color may represent received signal strength of a signal from a servicing BTS or the frame erasure rate (FER) experienced by the mobile communication unit, while the orientation of the automobile shape may represent a direction of travel of the mobile communication unit in cellular communication system 10. Rings 44, in the preferred embodiment, are also displayed, associated with the mobile communication units represented by automobile shapes 40, and provide an indication of additional performance characteristics (step 112), such as whether the mobile communication unit is in a handoff situation, while directional indicator arrow 48 points to the BTS with which the mobile communication unit is undergoing a handover transaction.

As system operation continues, the system performance parameters of the mobile communication units change, and hence the characterizing parameters of automobile shapes 40 are changed to provide an updated representation of the information displayed. Therefore, as the system operates, automobile shapes 40 are redefined by MMI processor 22 by modifying the defining parameters in response to changes in the performance characteristics (step 114), much in the same manner as the polygon shapes 30 and 32 representing the BTSs of the of cellular communication system 10 are redefined. In this manner the system operator may further visualize the present operation of the system.

In certain cellular communication systems, and particularly, CDMA type cellular communication systems, the mobile communication unit may be in a state called soft handover. In soft handover, the mobile communication unit is in simultaneous communication with two or more BTSs. In this situation a plurality of rings 44 are provided to indicate the number of BTSs with which the communication unit is in soft handover, each ring 44 representing a BTS. Furthermore, rings 44 are colored separately providing a further indication of the level of soft handover, that is, whether the mobile communication unit is in soft handover with two BTSs, three BTSs, etc. Sphere 46 and directional indicator arrow 48 on each ring 44 points to the BTS represented by the ring and with which the mobile communication unit is in soft handover. The height of the rings relative to automobile shape 40 and to each other may be defined by a parameter indicating the received signal strength at the mobile communication units of the BTS signal represented by the ring. Moreover, the diameter of the rings are progressively larger. This allows for altering the viewing perspective of the communication system while still allowing the system operator to perceive the performance characteristics represented by rings. Hence, the rings remain visible if the display is altered from a perspective view to a plan view.

Further shown in FIG. 3 for a mobile communication unit in soft handover is a trail of block symbols 42 from an automobile shape 40. In the preferred embodiment, block symbols 42 represent, geographically, the location at which the mobile communication unit entered into soft handover and continued in such. In addition, the color of block symbols 42 may be set to indicate the level of soft handover, e.g., with two BTSs, three BTSs, etc.

Figure 4:
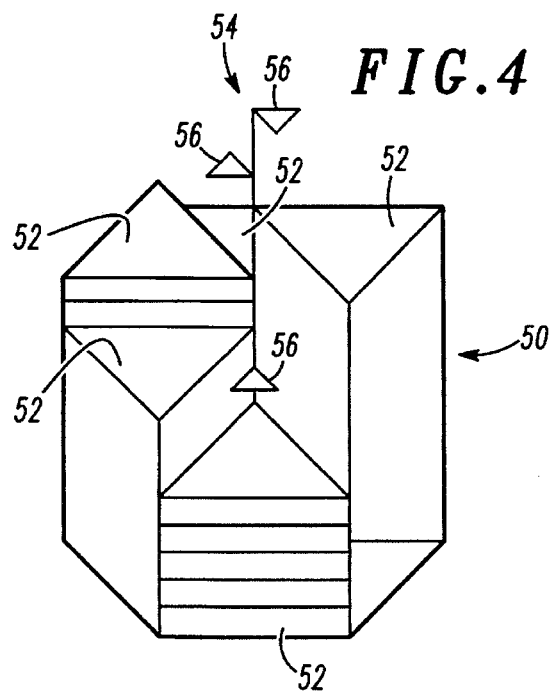
FIG. 4 is an enhanced graphical representation in accordance with a preferred embodiment of the present invention of a portion of the information of the cellular communication system shown in FIG. 3.

Referring now to FIG. 4, further features of the present invention will be demonstrated. In FIG. 3, the triangular sections 34 representing the sectors of a BTS were shown having a common height. In practice, however, the information represented by the height of the triangular sections may not be equal for each of the sectors of the BTS. This case is illustrated in FIG. 4 where the height of triangular sections 52 is varied for each sector of the cell represented by polygon shape 50. Moreover, indicator 54, having a same polygon shape as polygon shape 50, has triangular sections 56 positioned at various heights in response to the performance characteristic represented by indicator 54.

Figure 5:
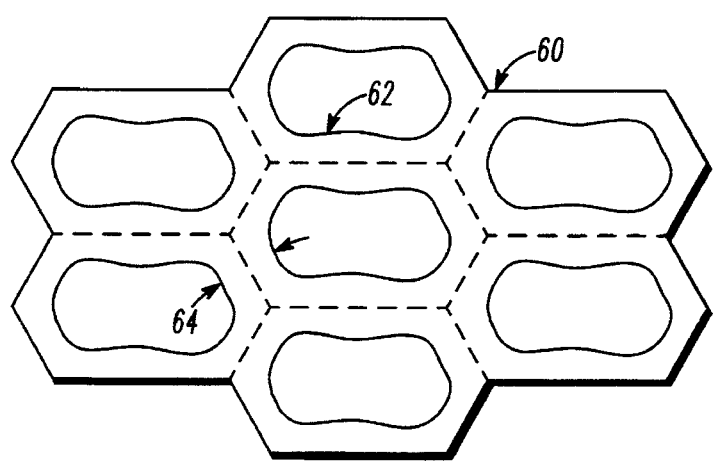
FIG. 5 is a graphical representation of information of a cellular communication system in accordance with another preferred embodiment of the present invention.

FIG. 5 illustrates the familiar grid structure 60 of cellular communication system 10 modified, however, to illustrate yet another feature of the present invention. As discussed above, certain communication systems provide a soft handover feature wherein the mobile communication unit is in simultaneous communication with a number of BTSs. In the present invention, regions wherein soft handovers are occurring is illustrated on the graphical display as a web shape 62 overlaid on the grid. The position and width of the individual webs 64 are defined by performance characteristics of cellular communication system 10 acquired by the MMI processor 22 from the MIB. Typically, the width of webs 62 is related to output power of the BTSs, the number of mobile communication units in soft handover, as well as geographical relationship of the BTSs and hence represents the inter-relationship of these elements.

Web shape 62 may also be advantageously employed to illustrate information relating to other performance characteristics of the cellular communication system. For example, web 62 may be defined to illustrate forward and reverse power levels, or levels of interference throughout cellular communication system 10.

The many features and advantages of this invention are apparent from the detailed specification and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention. For example, one of ordinary skill in the art will readily appreciate that the present invention may be easily adapted for use in a system planning tool. In such an embodiment, performance data, either recorded from an actual system or produced via system simulation, may be retained in a database. A suitable processor and graphic display may then be adapted to progressively read the data and generate the graphical display of the present invention so as to animate the system performance data. In this manner many pieces of information relating to system performance, otherwise incomprehensible by the system engineer, is easily visualized and understood.

It is, of course, to be understood that the present invention is, by no means, limited to the specific showing in the drawing, but also comprises any modification within the scope of the appended claims.

We claim:

1. A method of displaying communication system performance parameters comprising the steps of:

selecting a first group of system elements;

selecting a second group of system elements;

displaying each element of the first group of system elements as a shape having a plurality of defining parameters, the defining parameters associated with performance characteristics of the first group of system elements;

displaying each element of the second group of system elements as a shape having a plurality of defining parameters while displaying each element of the first group, the defining parameters associated with performance characteristics of the second group of system elements: and modifying the shape representing the first group of system elements by altering the plurality of defining parameters as performance parameter data changes with time during system operation.

2. The method of claim 1 further comprising the step of modifying the defining parameters of the first shape based upon a first plurality of input data indicative of the performance characteristics of the first group of system elements.

3. The method of claim 1 further comprising the step of modifying the defining parameters of the second shapes based upon a second plurality of input data.

4. The method of claim 1 further comprising associating a third shape with each of the first shapes, the third shape representing an additional performance characteristic.

5. The method of claim 1 further comprising associating a fourth shape with each of the second shapes, the fourth shape representing an additional performance characteristic.

6. The method of claim 1 further comprising displaying a fifth shape having a plurality of defining parameters, the fifth shape representative of an interaction between the elements of the first group and the second group.

7. The method of claim 1, wherein the communication system comprises a wireless communication system.

8. The method of claim 7, wherein the wireless communication system comprises a code division multiple access (CDMA) cellular system.

9. The method of claim 8, wherein at least one of the performance characteristics comprises a handoff indicator.

10. The method of claim 1, wherein the performance characteristics comprise transmitter power of a base station.

11. The method of claim 1, wherein the performance characteristics comprise a received signal strength measurement.

12. An apparatus for displaying performance characteristics of a communication system comprising:

a database containing a plurality of information related to the communication system;

a processor coupled to access the database and further coupled to an interface terminal including a graphic display device;

means for retrieving from the database information relating to a first element of the communication system;

means for generating on the interface terminal a first shape representative of the first element, the first shape having a plurality of defining parameters;

means for retrieving from the database information relating to a second element of the communication system;

means for generating on the interface terminal a second shape representative of the second element, the second shape having a plurality of defining parameters;

means for retrieving from the database information relating to time varying performance characteristics of the first and second elements; and means for modifying the defining parameters of the first and second shapes in response to the information relating to the time varying performance characteristics of the first and second elements, respectively.

13. The apparatus of claim 12 further comprising:

means for generating a third shape on the interface terminal, the third shape being associated with the first element and representative of a performance characteristic of the first element.

14. The apparatus of claim 12 further comprising:

means for generating a fourth shape on the interface terminal, the fourth shape being associated with the second element and representative of a performance characteristic of the second element.

15. The apparatus of claim 12 further comprising:

means for generating a fifth shape on the interface terminal, the fifth shape being associated with the first and second elements and representative of an inter-relationship characteristic between the first and second elements.

16. A communication system operation and maintenance center comprising:

an operations and maintenance processor for accessing a plurality of elements of the communication system for retrieving performance information and for storing the performance information in a database;

a man-machine interface processor coupled to access the database and further coupled to an interface terminal having a graphical display device, the man-machine interface being operable for representing on the interface terminal the elements of the communication system as a plurality of shapes and for varying the configuration of the shapes in response to the time varying performance information.

17. The operations and maintenance center of claim 16 wherein each of the shapes is defined by a plurality of defining parameters.

18. The operations and maintenance center of claim 17 wherein the additional shaped feature is representative of a performance characteristic of the element of the communication system.

19. The operations and maintenance center of claim 16 wherein the man-machine interface processor is operable to modifying the defining parameters of the shapes.

20. The operations and maintenance center of claim 16 wherein the man-machine interface processor is further operable to generate an additional shaped feature and for associating the additional shaped feature with an element of the communication system.

* * * * *